United States Patent [19]

Seiner et al.

[11] Patent Number: 4,652,492

[45] Date of Patent: Mar. 24, 1987

[54] USE OF A POLYAMIDE TO THICKEN AN AMINE

[75] Inventors: Jerome A. Seiner; Raymond F. Schappert, both of Pittsburgh, Pa.

[73] Assignee: PPG Industries, Inc., Pittsburgh, Pa.

[21] Appl. No.: 721,839

[22] Filed: Apr. 11, 1985

[51] Int. Cl.[4] .................. B32B 27/38; C09J 5/02
[52] U.S. Cl. ..................... 428/414; 156/307.3; 156/330; 525/418; 525/423; 525/533; 528/120; 528/332
[58] Field of Search .............. 156/307.3, 330; 428/414; 525/418, 533, 423; 528/120, 332

[56] References Cited

U.S. PATENT DOCUMENTS

| T970,004 | 5/1978 | Bauer. | |
|---|---|---|---|
| 2,930,773 | 3/1960 | Renfrew et al. | 528/120 |
| 3,023,190 | 2/1962 | Damusis | 260/47 |
| 3,036,975 | 5/1962 | Taub | 260/2 |
| 3,379,561 | 4/1968 | Manaka | 117/122 |
| 3,385,744 | 5/1968 | Van Sciver | 156/330 |
| 3,420,794 | 1/1969 | May et al. | 260/47 |
| 3,449,280 | 6/1969 | Frigstad | 260/29.2 |
| 3,496,142 | 2/1970 | Clelford et al. | 260/47 |
| 3,532,538 | 10/1970 | LeDoux et al. | 117/201 |
| 3,709,847 | 1/1973 | Toepfl et al. | 260/18 |
| 3,728,302 | 4/1973 | Helm | 260/37 |
| 3,759,914 | 9/1973 | Simms et al. | 260/37 EP |
| 3,793,271 | 2/1974 | Godfrey et al. | 260/18 PN |
| 4,107,116 | 8/1978 | Riew et al. | 260/23 EP |
| 4,298,656 | 11/1981 | Mendelsohn | 428/414 |
| 4,330,644 | 5/1982 | Allen | 525/523 |
| 4,388,426 | 6/1983 | Schure et al. | 523/462 |

OTHER PUBLICATIONS

Preliminary Data Sheet for VERSAMID 335, from General Mills, Kankakee, Ill. (9-21-64).

Primary Examiner—John J. Gallagher
Attorney, Agent, or Firm—Linda Pingitore

[57] ABSTRACT

A curable composition which contains polyepoxide and amine curing agent free of amide groups and which is of a substantially lower viscosity than the polyepoxide is improved by thickening the amine to a viscosity comparable to that of the polyepoxide. The amine is thickened by either incorporating into the amine curing agent a polyamide in an amount not exceeding 35 percent by weight based on the amount of amine curing agent of a polyamide; or converting a portion of the amine curing agent to polyamide by in situ chain extension to form amide groups wherein the chain extension is carried out in an excess of amine curing agent before the amine curing agent is admixed with the polyepoxide component of the curable composition; or a combination thereof.

21 Claims, No Drawings

USE OF A POLYAMIDE TO THICKEN AN AMINE

BACKGROUND OF THE INVENTION

The present invention relates to epoxy-amine based curable compositions.

Often the amine which is used as the curing agent for epoxy resin based curable compositions has a viscosity which is substantially lower than that of the epoxy resin. This typically causes problems at the time of formulating the composition since the disparities in viscosity make mixing of the two components extermely difficult. Attempts to address this problem by thickening the amine have met with little success since the art-recognized thickening agents utilized such as fumed silica, clay, and cellulosic materials detrimentally affect the physical properties of the curable composition. There is a need, therefore, for a way to equalize the viscosities of such two component curable compositions without detrimentally affecting the physical properties of the final cured composition.

SUMMARY OF THE INVENTION

In accordance with the present invention there is provided an improved curable composition comprising a polyepoxide and an amine curing agent free of amide groups which is of substantially lower viscosity than the polyepoxide, wherein the improvement comprises thickening the amine to a viscosity comparable to that of the polyepoxide by either incorporating into the amine curing agent a polyamide in a positive amount not exceeding 35 percent by weight based on the amount of amine curing agent; or converting a portion of the amine curing agent to polyamide by in situ chain extension to form amide groups wherein the chain extension is carried out in an excess of amine curing agent before the amine curing agent is admixed with the polyepoxide component of the curable composition; or a combination thereof.

There is also provided an improved method for preparing an adhesive bond between two surfaces to form a bonded structure.

DETAILED DESCRIPTION OF THE INVENTION

The curable composition of the present invention comprises a polyepoxide and an amine curing agent which is of substantially lower viscosity than the polyepoxide. The composition is improved by thickening the amine to a viscosity comparable to that of the polyepoxide by either incorporating into the amine curing agent up to 35 percent by weight based on the amount of amine curing agent of a polyamide; or converting a portion of the amine curing agent to polyamide by in situ chain extension to form amide groups wherein the chain extension is carried out in an excess of amine curing agent. A combination of these alternatives can also be utilized.

The polyepoxides useful herein are those having a 1,2-epoxy group, i.e.,

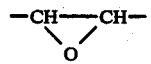

present in the molecule. Hydroxyl groups may also be present and often are. Polyepoxides contain more than one 1,2-epoxy group per molecule. In general, the epoxide equivalent weight will range from about 140 to about 4,000. These polyepoxides are saturated or unsaturated, cyclic or acyclic, aliphatic, alicyclic, aromatic or heterocyclic. They can contain substituents such as halogen, hydroxyl and ether groups.

One useful class of polyepoxides comprises the epoxy polyethers obtained by reacting an epihalohydrin (such as epichlorohydrin or epibromohydrin) with a polyphenol in the presence of an alkali. Suitable polyphenols include resorcinol, catechol, hydroquinone, bis(4-hydroxyphenyl)-2,2-propane, i.e., bisphenol A; bis(4-hydroxyphenyl)-1,1-isobutane; 4,4-dihydroxybenzophenone; bis(4-hydroxyphenol)-1,1-ethane; bis(2-hydroxyphenyl)-methane; and 1,5-hydroxynaphthalene. One very common polyepoxide is a polyglycidyl ether of a polyphenol, such as bisphenol A.

Another class of polyepoxides are the polyglycidyl ethers of polyhydric alcohols. These compounds may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, trimethylolpropane, and bis(4-hydroxycyclohexyl)-2,2-propane.

Another class of polyepoxides are the polyglycidyl esters of polycarboxylic acids. These compounds are produced by the reaction of epichlorohydrin or a similar epoxy compound with an aliphatic or aromatic polycarboxylic acid such as oxalic acid, succinic acid, glutaric acid, terephthalic acid, 2,6-naphthalene dicarboxylic acid and dimerized linoleic acid.

Still another class of polyepoxides are derived from the epoxidation of an olefinically unsaturated alicyclic compound. These polyepoxides are non-phenolic and are obtained by epoxidation of alicyclic olefins, for example, by oxygen and selected metal catalysts, by perbenzoic acid, by acid-aldehyde monoperacetate or by peracetic acid. Among such polyepoxides are the epoxy alicyclic ethers and esters well known in the art.

Useful polyepoxides also include those containing oxyalkylene groups in the epoxy molecule. Such oxyalkylene groups have the general formula:

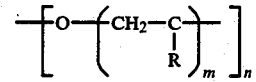

where R is hydrogen or alkyl, preferably a lower alkyl having from 1 to 6 carbon atoms, m is 1 to 4 and n is 2 to 50. Such groups are pendant to the main molecular chain of the polyepoxide or are part of the main chain itself. The proportion of oxyalkylene groups in the polyepoxide depends upon many factors, including the chain length of the oxyalkylene group, the nature of the epoxy and the degree of water solubility desired.

Another class of polyepoxides consists of the epoxy novolac resins. These are obtained by reacting an epihalohydrin with the condensation product of aldehyde and monohydric or polyhydric phenols. A typical example is the reaction product of epichlorohydrin with a phenolformaldehyde condensate.

The polyepoxides can be partially defunctionalized by carboxylic acids, alcohol, water, phenols, mercaptans or other active hydrogen-containing compounds to give hydroxyl-containing polymers if desired which may be useful in this invention.

Examples of amine curing agents free of amide groups which have a substantially lower viscosity than the polyepoxides described above are aliphatic polybasic amines including secondary and tertiary amines, which are preferred, and higher amines. Examples include ethylene diamine, diethylene triamine, triethylene tetramine, tetraethylene pentamine, 1,4-diaminobutane, 1,3-diaminobutane, hexamethylene diamine and 3-(N-isopropylamino) propylamine. Aromatic amines, although not preferred, can also be utilized herein, for example metaphenylene diamine, P,P'-methylene dianiline, paraphenylene diamine, and 1,4-aminonaphthalene. The actual numerical values for viscosity of the epoxy and amine will vary widely depending upon the particular choice of materials and are not, therefore, in and of themselves important. What is important to note is that the amine will be of substantially lower viscosity than the polyepoxide and as a result formulating difficulties exist. In adhesive applications, not only is the actual physical admixture of the two components difficult to accomplish but the disparities in viscosity lead to problems in the formulated adhesive composition. When the amine is unthickened, sagging of the applied adhesive composition is likely to occur since the unthickened amines are essentially liquid in nature and have very low viscosities, e.g. less than 1 as measured by a test described below. Whereas if the viscosities of the epoxy and amine are comparable, the viscosity of the adhesive composition will be such that sagging will be minimized.

The thickened amines typically have a viscosity ranging from 1 to 5 seconds while the curable package which contains the polyepoxide typically has a viscosity ranging from 10 to 40 seconds. The viscosities are measured in the following manner: A 20-gram sample is forced through an orifice having a diameter of 0.104 inches at 72° F. under 20 pounds per square inch pressure to determine the amount of time in seconds required by the sample to move through the orifice. This method is preferred because the magnitude of the viscosities of the components being measured tend to hamper Brookfield viscosity measurements and lead to inaccurate results.

Polyamides which are useful as thickeners in the present compositions are those derived from fatty acids or dimerized fatty acids or polymeric fatty acids and aliphatic polyamines. The polymeric fatty acids may be reacted with a variety of aliphatic polyamines for the production of the polyamide. The amidification reaction may be carried out under the usual conditions employed for this purpose. Polyamides of this type generally have molecular weights varying from 700 to 15,000, preferably 1,000 to 10,000, more preferably 1,000 to 5,000. The melting points vary, depending upon the reactants and the reaction conditions. Where aliphatic diamines, such as ethylene diamine, are employed for the preparation of the polyamide the resin will generally melt within the approximate range of 80° C.-120° C., and usually within the range of 100°-105° C.

Higher melting polyamide resins, for example melting within the range of 130°-215° C., may be made by employing a mixture of polymeric fatty acids and other polybasic acids, the latter having at least two carboxyl groups which are separated by at least 3 and typically not more than 8 carbon atoms. Typical of these polybasic acids are the aliphatic acids, glutaric, adipic, pimelic, suberic, azelaic, and sebacic, and the aromatic acids, terephthalic, and isophthalic acids. The melting point of the copolymer resin may vary within the range previously indicated, depending upon the particular reactants, relative ratios thereof, as well as the reaction conditions.

Low melting polyamide resins melting within the approximate range of 25°-90° C. may be prepared from polymeric fatty acids and aliphatic polyamines having at least 3 atoms intervening between the amine groups principally involved in the amidification reaction. These three atoms may be carbon atoms or hetero atoms. Typical of the polyamines which may be used are diethylene triamine, triethylene tetramine, tetraethylene pentamine, 1,4-diaminobutane, 1,3-diaminobutane, hexamethylene diamine, 3-(N-isopropylamine)-propylamine, 3,3'-iminobispropylamine, and the like. A preferred group of these low melting polyamides are derived from polymeric fatty acids, and diethylene triamine and are liquid at room temperature.

Suitable such polyamides are commercially available under the trade designation of VERSAMIDE polyamide resins, e.g. VERSAMIDE 335, 750 and 744, and are amber-colored resins having a number average molecular weight up to about 10,000, preferably from 1,000 to 4,000 and a softening point from about below room temperature to 190° C.

The preparation of such VERSAMIDE polyamide resins is well known and by varying the acid and/or functionality of the polyamine, a great variety of viscosities, molecular weights and levels of active amino groups spaced along the resin molecule can be obtained. Typically, the VERSAMIDE polyamide resins useful herein have amine values from 0 to 25, preferably 0 to 10, more preferably 0 to 5; viscosities of from about 1 to 30 poises and polydispersities of less than 5.

The polyamide is incorporated into the amine in a positive amount not exceeding 35 percent by weight based on the amount of amine curing agent. Preferably, a positive amount not exceeding 15 percent by weight is utilized and most preferred is a positive amount not exceeding 10 percent by weight.

The amine value is a measure of the base content and is equal to the amount in milligrams of potassium hydroxide per gram of sample. This value is calculated based upon the following experimental procedure. The sample is weighed into a beaker and dissolved in sixty milliliters of acetic acid. The solution is titrated using perchloric acid dissolved in acetic acid with methyl violet in acetic acid used as the indicator. The amine value is equal to the amount of titrant multiplied by the normality of the titrant multiplied by the equivalent weight of potassium hydroxide which is 56.1, this product is divided by the sample weight.

Molecular weight of the polyamides is determined by gel permeation chromatography (GPC) using a differential refractometer as the detector. The instrument is first calibrated using a polystyrene standard. Polystyrene standards used can be purchased from Pressure Chemicals Company, Pittsburgh, Pa. The polystyrene standards have dispersities (dispersity=weight average molecular weight/number average molecular weight) ranging from 1.05 to 1.10. The viscosity average molecular weights of the polystyrene standards used were 900,000; 233,000; 50,000; 17,500; 4,000. To obtain a calibration curve, a set of 0.1 percent (10 milligram polystyrene/1.0 ml tetrahydrofuran) polystyrene solutions in tetrahydrofuran were prepared and a 0.5 ml sample size was injected into the columns and a GPC chromatogram was obtained. The elution volume of each peak corresponding to a given molecular weight of the polystyrene standard was measured and the data was plotted on a semilogarithmic paper (logarithm scale in the ordinate and linear scale in the abscissa). A linear least squares plot of $\log_{10}$ (molecular weight) versus elution volume in milliliters is used as a calibration curve. The lowest molecular weight of the polystyrene standard used was 4,000, and the calibration curve beyond that was extrapolated down to 100. The upper and lower exclusion limits of this set of columns are 5,000,000 and 100, respectively, in terms of polystyrene molecular weight. The sample whose molecular weights are to be determined was prepared as a 1.0 percent tetrahydrofuran solution. After filtration through a 0.5 micron filter, available from Millapore Corporation, a 0.5 ml sample size was injected into the columns and a GPC chromatogram obtained under the same experimental conditions as the calibration. From the resulting calibration curve of molecular weight versus retention time, a molecular weight relative to the standard can be assigned to the retention times of the sample. The height (H) of the curve at the corresponding retention times is recorded by the computer. From these height-molecular weight (M) combinations, the following averages are calculated:

Number average molecular weight $=\Sigma H/\Sigma H/M$

This is the number reported.

The amine curing agent also can be thickened to a viscosity comparable to that of the polyepoxide by converting a portion of the amine into polyamide by in situ chain extension to form amide groups wherein the chain extension is carried out in an excess of amine curing agent before the amine curing agent is admixed with the polyepoxide component of the curable composition. The aforesaid in situ chain extension to form amide groups can be done in a number of ways. For example, one way is by the condensation between a mono or polyfunctional carboxylic acid and excess amine curing agent. The amine and acid are simply mixed together and heated with the removal of water. Examples of suitable acids include benzoic acid, adipic acid, glutaric acid, linoleic acid and dimerized fatty acids. The amines have been detailed previously in the specification. Another method is by the condensation between a mono or polyfunctional ester and excess amine curing agent. The amine and ester are mixed together and heated with the removal of the alcohol of the corresponding ester group. Examples of esters include ethyl benzoate, diethyl adipate, and diethyl glutarate. A further method is by the addition of an acid halide to excess amine curing agent. The amine and acid halide are simply mixed together at ambient temperature with the removal of the acid salt which corresponds to the halide used. This salt is removed by filtration. Examples of suitable acid halides include adipoyl chloride, malonyl chloride and benzoyl chloride.

The curable composition of the present invention can also contain a variety of additives including pigments, reinforcements, thixotropes, plasticizers, extenders, stabilizers antioxidants and other modifiers.

The claimed compositions are typically prepared by combining the polyepoxide and the curing agent at the time immediately before use. The compositions can be cured either by allowing them to stand at ambient temperature or by a combination of this room temperature cure with baking. The compositions can be cured at ambient temperature typically in a period ranging from about 10 hours to about 72 hours, preferably from about 18 hours to about 36 hours. If ambient temperature and baking are utilized in combination, the composition is typically allowed to stand for a period of from about 10 hours to about 36 hours followed by baking at a temperature of from about 80° C. to about 220° C., preferably from about 120° C. to about 180° C. for a period of time ranging from about 10 minutes to about one hour.

The use of a polyamide as has been described above to thicken the amine component of a curable epoxy-amine composition results in excellent formulating advantages. Since the disparity in viscosity between the two components is equalized, mixing of the components is facilitated resulting in savings of time, labor and materials. Moroever, all of these benefits result without detrimentally affecting the physical properties of the resultant cured composition. Previously, conventional thickeners such as silica, clay, and cellulosic materials had been utilized which detracted from the physical properties of the cured composition.

Also provided by the claimed invention is an improved method for preparing an adhesive bond between two surfaces to form a bonded structure. The method comprises applying to at least one of the surfaces the improved curable composition detailed above and then curing the composition. The composition and mode of effecting cure have been described in detail above. The claimed composition and method are particularly applicable to structural building components of transportation vehicles, e.g., doors, frames, hoods and the like of automobiles, buses, vans and other vehicles.

The following Examples are only illustrative of the invention and are not meant to limit it to their details.

EXAMPLE I

In this Example several adhesive compositions were prepared utilizing a variety of amine curing agents. Compositions A through G utilized a variety of commercially available polyamides to thicken the amines while compositions H, I and J were control compositions which utilized the unthickened amines.

Each of the amines was thickened in the manner described below for tetraethylene pentamine and VERSAMIDE 335.

A suitable reactor vessel was charged with 90 parts by weight of the tetraethylene pentamine and subsequently heated to 90° C. To this hot amine was added 10 grams of VERSAMIDE 335 which is commercially available from General Mills and the suspension stirred until all solids had dissolved. The reaction mixture was allowed to cool yielding a viscous solution of tetraethylene pentamine having a gel-like consistency. An adhesive using this thickened amine as a curing agent was formulated in the following manner:

The adhesive composition was formulated according to the proportions set out below in Table I. The amount of package II was selected so that the composition of each Example had a constant amount of amine hydrogen. The two packages were simply combined and mixed together. Tensile Lap Shear Strength was determined as described below. Lap Shear bonds for testing were prepared using two strips of cold rolled steel (1 inch×4 inches×72 mils thick) and also two strips of galvanized steel (1 inch×4 inches×72 mils thick). A 6 mil thick film of each of the compositions was applied onto one of the metal strips and then a second strip was placed over top of the first strip so that only one square inch strip overlapped. The compositions were cured by first allowing them to stand at room temperature for 24 hours and then baking them for one hour at 350° F. (177° C.). The tensile shear strength of the adhesive bonds was determined according to ASTM D-1002-65 (Briefly, the ends of the strips were pulled with an INSTRON TESTER measuring device and the tensile lap shear strength determined.) The values which appear in Table II are an average of two separate determinations.

which has been thickened with a polyamide according to the present invention exhibit physical properties which are comparable to and often better than those exhibited by compositions prepared with unthickened amine curing agent. Moreover, formulating advantages result because preparation and mixing of the compositions is facilitated since the viscosities of the epoxide and curing agent packages are equalized.

EXAMPLE II

TABLE I

| Ingredients | Parts by Weight (grams) | | | | | | | | | |
|---|---|---|---|---|---|---|---|---|---|---|
| | A | B | C | D | E | F | G | H | I | J |
| Package I[1]: | | | | | | | | | | |
| EPON 828 | 20 | 20 | 20 | 20 | 20 | 20 | 20 | 20 | 20 | 20 |
| aluminum powder | | | | | | | | | | |
| epoxy silane | | | | | | | | | | |
| CAB-O-SIL | | | | | | | | | | |
| Package II: | | | | | | | | | | |
| triethylene tetramine thickened[2] with VERSAMIDE 335 | 1.08 | | | | | | | | | |
| diethylene triamine thickened[3] with VERSAMIDE 335 | | 0.92 | | | | | | | | |
| tetraethylene pentamine thickened[4] with VERSAMIDE 335 | | | 1.2 | | | | | | | |
| tetraethylene pentamine thickened[5] with VERSAMIDE 750 | | | | 1.2 | | | | | | |
| tetraethylene pentamine thickened[6] with VERSAMIDE 744 | | | | | 1.2 | | | | | |
| tetraethylene pentamine thickened[7] with SYLVACHEM E5 | | | | | | 1.2 | | | | |
| tetraethylene pentamine thickened[8] with EMIREZ 1549 | | | | | | | 1.2 | | | |
| triethylene tetraamine | | | | | | | | 0.97 | | |
| diethylene triamine | | | | | | | | | 0.83 | |
| tetraethylene pentamine | | | | | | | | | | 1.08 |

[1]Package I was prepared by admixing together 75 parts by weight of the EPON 828 (a polyepoxide which is the diglycidyl ether of bisphenol A and is commercially available from Shell Chemical Co.); 38 parts by weight of the aluminum powder; 0.1 parts by weight of epoxy silane (this is commercially available from Union Carbide Co. as A-187) and 4.5 parts by weight of the CAB-O-SIL (this is fumed silica which is commercially available from Cabot).
[2]This thickened composition was prepared by combining 90 parts by weight of amine and 10 parts by weight of VERSAMIDE 335 polyamide which is commercially available from General Mills and has an amine value of 3, a number average molecular weight of 1699, as determined by gel permeation chromatography (GPC) using a polystyrene standard, and a polydispersity of 1.90.
[3]This thickened composition was prepared as described above in footnote 2.
[4]This thickened composition was prepared as described above in footnote 2.
[5]This thickened composition was prepared by combining 90 parts by weight of amine and 10 parts by weight of VERSAMIDE 750 polyamide which is commercially available from General Mills and has an amine value of 2.3, a number average molecular weight of 3,244, as determined by GPC using a polystyrene standard, and a polydispersity of 3.86.
[6]This thickened composition was prepared by combining 90 parts by weight of amine and 10 parts by weight of VERSAMIDE 744 polyamide which is also commercially available from General Mills and has an amine value of 0, a number average molecularweight of 2,444, as determined by GPC using a polystyrene standard, and a polydispersity of 2.78.
[7]This thickened composition was prepared by combining 90 parts by weight of amine and 10 parts by weight of SYLVACHEM E5 polyamide which is commercially available from Sylvachem and has an amine value of 0.8, a number average molecular weight of 1,688, as determined by GPC using a polystyrene standard, and a polydispersity of 2.38.
[8]This thickened composition was prepared by combining 90 parts by weight of amine and 10 parts by weight of EMIREZ 1549 polyamide which is commercially available from Emery Chemical Co. and has an amine value of 7, a number average molecular weight of 2,777, as determined by GPC using a polystyrene standard, and a polydispersity of 4.70.

TABLE II

| Example | Tensile Lap Shear Strength lbs/in$^2$ |
|---|---|
| A | 2,291 |
| B | 1,215 |
| C | 2,826 |
| D | 2,104 |
| E | 877 |
| F | 3,122 |
| G | 1,530 |
| H | 2,250 |
| I | 1,541 |
| J | 2,531 |

The results of this testing illustrate that adhesive compositions formulated with an amine curing agent This Example is a comparative example. In this Example tetraethylene pentamine, one of the amine curing agents utilized above in Example I, was thickened with three art-recognized conventional thickeners and these thickened amines were utilized to formulate adhesive compositions. The compositions utilized an epoxide package identical to that utilized in Example I, above. The compositions were then tested for tensile lap shear bond strength.

| Ingredients | Parts by Weight (grams) | | |
|---|---|---|---|
| | A | B | C |
| Package I[9]: | | | |

-continued

| Ingredients | Parts by Weight (grams) | | |
|---|---|---|---|
| | A | B | C |
| EPON 828 | 20 | 20 | 20 |
| aluminum powder | | | |
| epoxy silane | | | |
| CAB-O-SIL | | | |
| Package II: | | | |
| tetraethylene pentamine[10] thickened with fumed silica | 1.15 | | |
| tetraethylene pentamine[11] thickened with bentone clay | | 1.32 | |
| tetraethylene pentamine[12] thickened with cellulosic material | | | 1.2 |

[9]Package I was prepared as was described above in Example I, footnote 1.
[10]This thickened preparation was made by combining 90 parts by weight of tetraethylene pentamine and 6 parts by weight of fumed silica commercially available from Cabot as CAB-O-SIL.
[11]This thickened preparation was made by combining 90 parts by weight of tetraethylene pentamine and 20 parts by weight of bentone clay.
[12]This thickened preparation was made by combining 90 parts by weight of tetraethylene pentamine and 11.5 parts by weight of a cellulosic thickener commercially available from York Castor Oil Company as RHEOCIN.

The compositions were formulated in the proportions set out above by admixing together the Packages I and II. Tensile Lap Shear Strength was evaluated utilizing cold rolled steel by the method described above in Example I. The compositions were cured by allowing them to stand at room temperature for 24 hours and then by baking them at 350° F. (177° C.) for one hour. The values set forth below are an average of two separate determinations.

| Example | Tensile Lap Shear Strength lbs/in$^2$ |
|---|---|
| A | 855 |
| B | 1,275 |
| C | 994 |

The results of this testing illustrated that conventional thickeners for amine curing agents have a tendency to detract from the physical properties of the cured composition and, therefore, are disadvantageous.

What is claimed is:

1. In a method for preparing an adhesive bond between two surfaces to form a bonded structure which comprises applying to at least one of the surfaces a curable composition comprising a polyepoxide and an amine curing agent free of amide groups which is of substantially lower viscosity than the polyepoxide and curing the curable composition, wherein the improvement comprises thickening the amine to a viscosity comparable to that of the polyepoxide by either incorporating into the amine curing agent a polyamide in a positive amount not exceeding 35 percent by weight based on the amount of curing agent; or converting a portion of the amine curing agent to polyamide by in situ chain extension to form amide groups wherein the chain extension is carried out in an excess of amine curing agent before the amine curing agent is admixed with the polyepoxide component of the curable composition; or a combination thereof.

2. The method of claim 1 wherein the amount of polyamide which is incorporated into the amine is a positive amount not exceeding 15 percent by weight.

3. The method of claim 2 wherein the amount of polyamide which is incorporated into the amine is a positive amount not exceeding 10 percent by weight.

4. The method of claim 1 wherein the polyamide has an amine value of up to 25.

5. The method of claim 4 wherein the polyamide has an amine value of up to 10.

6. The method of claim 5 wherein the polyamide has an amine value of up to 5.

7. The method of claim 1 wherein the polyamide has a molecular weight of up to 10,000.

8. The method of claim 7 wherein the polyamide has a molecular weight of from about 1,000 to about 4,000.

9. The method of claim 1 wherein the polyamide is a condensation product of an unsaturated fatty acid with an aliphatic amine.

10. A bonded structure prepared by the method of claim 1.

11. A bonded structure of claim 10 which is a structural component of a transportation vehicle.

12. In a curable composition comprising a polyepoxide and an amine curing agent free of amide groups which is of substantially lower viscosity than the polyepoxide, wherein the improvement comprises thickening the amine to a viscosity comparable to that of the polyepoxide by either incorporating into the amine curing agent a polyamide in a positive amount not exceeding 35 percent by weight based on the amount of amine curing agent; or converting a portion of the amine curing agent to polyamide by in situ chain extension to form amide groups wherein the chain extension is carried out in an excess of amine curing agent before the amine curing agent is admixed with the polyepoxide component of the curable composition; or a combination thereof.

13. The composition of claim 12 wherein the amount of polyamide which is incorporated into the amine is a positive amount not exceeding 15 percent by weight.

14. The composition of claim 13 wherein the amount of polyamide which is incorporated into the amine is a positive amount not exceeding 10 percent by weight.

15. The composition of claim 12 wherein the polyamide has an amine value of up to 25.

16. The composition of claim 15 wherein the polyamide has an amine value of up to 10.

17. The composition of claim 16 wherein the polyamide has an amine value of up to 5.

18. The composition of claim 12 wherein the polyamide has a molecular weight of up to 10,000.

19. The composition of claim 18 wherein the polyamide has a molecular weight within the range of from about 1,000 to 4,000.

20. The composition of claim 12 wherein the polyamide is a condensation product of an unsaturated fatty acid with an aliphatic amine.

21. The composition of claim 12 wherein the amine is a secondary or tertiary amine.

* * * * *